United States Patent [19]
Habicht et al.

[11] Patent Number: 5,494,370
[45] Date of Patent: Feb. 27, 1996

[54] T-JOINT BETWEEN TWO SECTIONS

[75] Inventors: Siegfried Habicht; Manfred Girnus, both of Leopoldshöhe, Germany

[73] Assignee: Schüco International, KG, Bielefeld, Germany

[21] Appl. No.: 205,043

[22] Filed: Mar. 2, 1994

[30]   Foreign Application Priority Data

Mar. 2, 1993 [DE] Germany .......................... 43 06 379.9

[51] Int. Cl.$^6$ .............................. F16S 3/06; E06B 3/964; F16B 7/00; F16B 11/00
[52] U.S. Cl. .......................... 403/403; 403/231; 403/267; 403/265
[58] Field of Search ..................... 403/267, 266, 403/265, 268, 231, 260, 258, 256, 403, 402; 52/655.1, 665, 456, 656.9, 656.5, 656.6; 49/504

[56]   References Cited

U.S. PATENT DOCUMENTS

| | | | |
|---|---|---|---|
| 2,736,930 | 3/1956 | Longley | 403/265 X |
| 3,749,432 | 7/1973 | Janssen | 52/665 X |
| 3,828,516 | 8/1974 | Kern | 52/656.9 X |
| 5,363,625 | 11/1994 | Philippi | 403/260 X |

FOREIGN PATENT DOCUMENTS

| | | | |
|---|---|---|---|
| 2750307 | 5/1979 | Germany | 403/402 |
| 3041326 | 5/1982 | Germany | 52/665 |
| 566486 | 9/1975 | Switzerland | 403/402 |

*Primary Examiner*—Anthony Knight
*Attorney, Agent, or Firm*—Darby & Darby

[57]   ABSTRACT

A T-joint includes a frame extending along a longitudinal axis. A rung has at least one cavity and at least one cavity wall. The at least one cavity wall is parallel to the longitudinal axis. The rang has at least one fill opening. At least one T-joint part is fixedly connected to the frame. The at least one T-joint part extends into the at least one cavity. The at least one T-joint part is mechanically connected to the rung and is glued to the rung. The at least one T-joint part has at least one glue distribution channel that is substantially parallel to the longitudinal axis. The at least one T-joint part has at least one transverse opening which extends toward the at least one cavity wall such that the at least one fill opening, the at least one glue distribution channel and the at least one transverse opening are in fluid communication.

7 Claims, 4 Drawing Sheets

T-JOINT BETWEEN TWO SECTIONS

FIELD OF THE INVENTION

The present invention relates to a T-joint between two sections. More specifically, the present invention relates to a T-joint between a rung-type section and a frame-type section, such that at least one T-joint part extending into a cavity of the rung-type section and the T-joint part is fastened to the frame-type section. The T-joint part is mechanically connected to the rung-type section by means of screws, pins, or the like, and additionally is glued to the rung-type section, at least in the impact- or joint-area between the frame-type section and rung-type section.

BACKGROUND OF THE INVENTION

In conventional T-joints, the glued connection between the T-joint and the rung-type section is implemented in such a way that glue is applied to the lower cavity area, into which the T-joint extends, before assembling the frame-type section and the rung-type section. A two-component glue can be used for this purpose. This operation essentially occurs under exposed conditions and is generally afflicted by ambient air with the associated disadvantages of being polluted by these working conditions. Another disadvantage is that the glue which is smeared into the lower end region of the cavity is generally pushed and displaced further into the cavity by the T-joint in an uncontrolled manner, so that practically no, or only an insufficient amount of glue remains in the actual impact- or joint- area between the frame-type section and the rung-type section.

In order to eliminate the disadvantages described above, it is an object of the present invention to design a T-joint which achieves an easier and more specifically directed application of the glue under simplified working conditions.

SUMMARY OF THE INVENTION

According to the present invention, this object is achieved by a T-joint part that has at least one glue distribution channel, which runs parallel to the frame-type section, and which is accessible through at least one fill opening in the rung-type section, and which has at least one transverse opening extending toward the cavity wall of the rung-type section, with the wall in turn running parallel to the frame-type section.

The present invention makes it possible to first form a purely mechanical connection between the T-joint part and the rung-type section and then to press glue from the outside into the glue distribution channel and, through the traverse openings thereof, into the region between the cavity wall on the one hand and the T-joint part on the other hand. The position of the transverse opening or openings here can structurally guarantee that a secure glue connection is formed especially in the impact- or joint-area.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF PRESENTLY PREFERRED EMBODIMENTS

Figure 1:
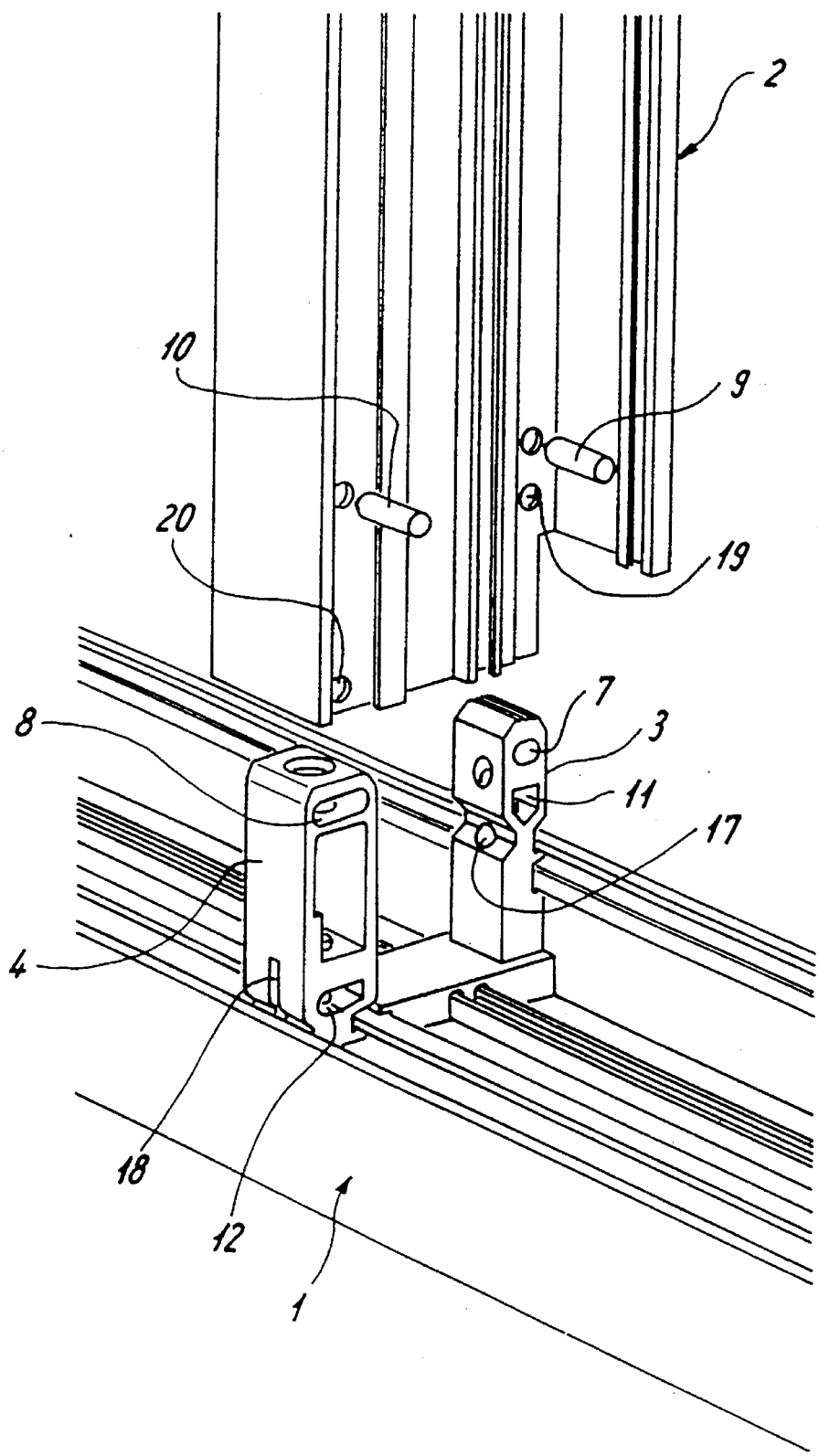
FIG. 1 is a perspective view of a T-joint between a rung-type section and a frame-type section before final assembly.

Referring now to the drawing figures, a frame-type section 1 and a rung-type section 2 of a T-joint, are illustrated.

In the illustrated embodiment, the frame-type section 1 is designed as a thermally insulated section. Two T-joint parts 3 and 4 are attached to the frame 1 and respectively extend into appropriately dimensioned cavities 5 and 6 of the rung-type section 2.

The upper end areas of the T-joint parts 3 and 4 have receiving channels 7 and 8 respectively, which engage with fastening pins 9 and 10, respectively, which pass through the rung-type section 2. Fastening pins 9 and 10 establish a mechanical connection between the T-joint parts 3 and 4 as well as the rung-type section 2. In an alternate embodiment, fastening screws (not shown) can be used instead of the fastening pins 9, 10.

The T-joint parts 3 and 4 each have glue distribution channels 11 and 12 respectively, which pass all the way through the longitudinal length of the frame-type section 1. Channels 11 and 12 have at least one transverse opening 17 and 18 respectively, running toward a cavity wall 13, 14, 15 or 16. The cavity walls 13, 14, 15 and 16 are parallel to the longitudinal length or axis of the frame-type section 1.

Figure 2:
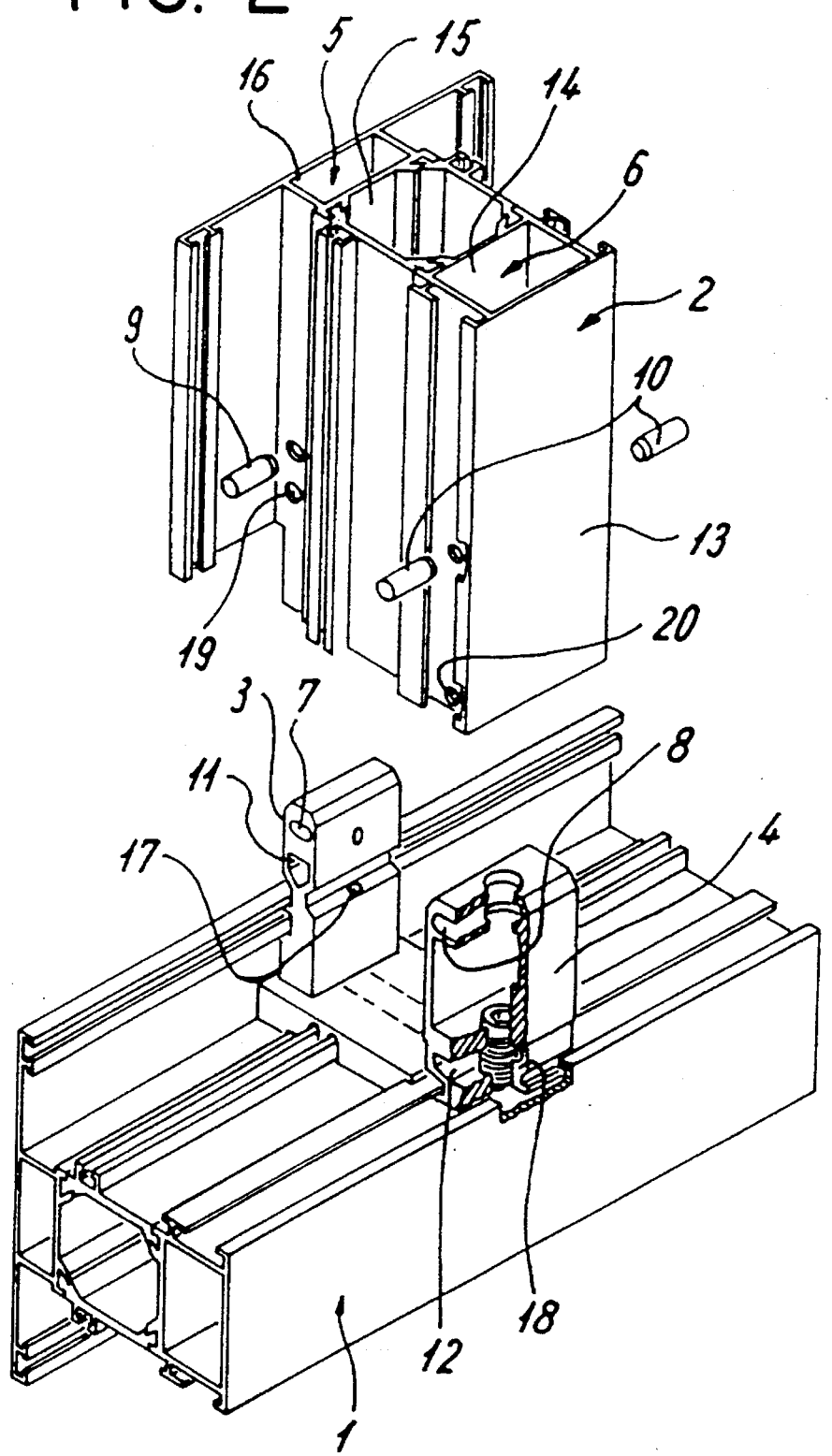
FIG. 2 is another perspective view of the T-joint of FIG. 1 viewed from another direction.

According to FIGS. 1 and 2, the two glue distribution channels 11, 12 are designed as frontally open cavities of the respective T-joint parts 3 and 4. After parts 3 and 4 are pushed into the respective cavity 5 or 6 of the rung-type section, channels 11 and 12 are closed by the frontal wall.

After the two sections 1 and 2 have been assembled, an adhesive, e.g. a two-component glue, can be injected into a respective glue distribution channel 11 or 12, through at least one fill opening 19 or 20, which terminates in the respective glue distribution channel 11 or 12. The glue then passes through the corresponding transverse opening 17 or 18 and is distributed to the respective cavity wall 13, 14, 15, or 16. The corresponding transverse openings 17 or 18 are preferably disposed in the immediate joint- or impact- area. In this way, a clean glue joint between the T-joint parts 3 and 4 as well as the rung-type section 2 is achieved, especially in the critical lower joint area. The transverse openings 17 or 18 can have the form of slots or holes and can optionally be disposed on one or both sides of the respective T-joint part 3 or 4.

Figure 3A:
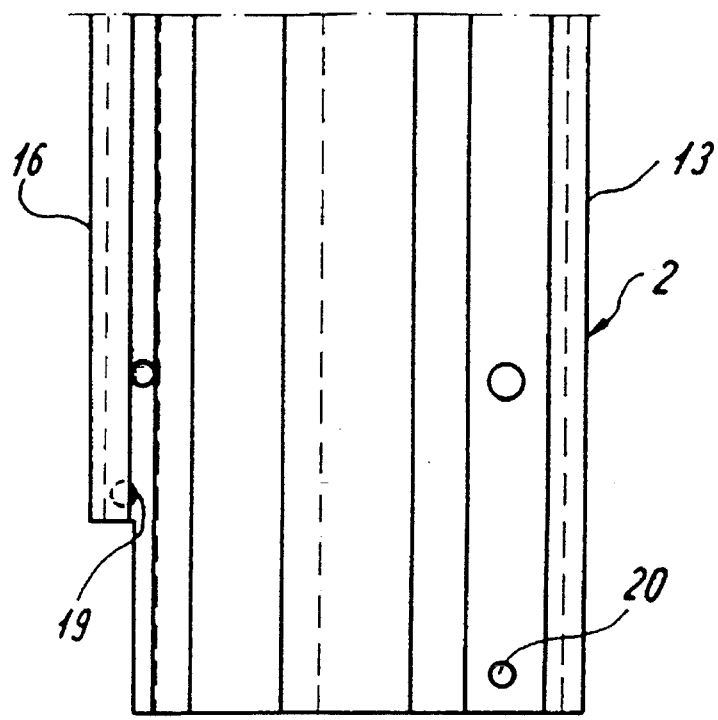
FIG. 3 is a partial sectional view through a frame-type section of a T-joint with a partial view of a rung-type section that is to be connected.
Figure 3B:
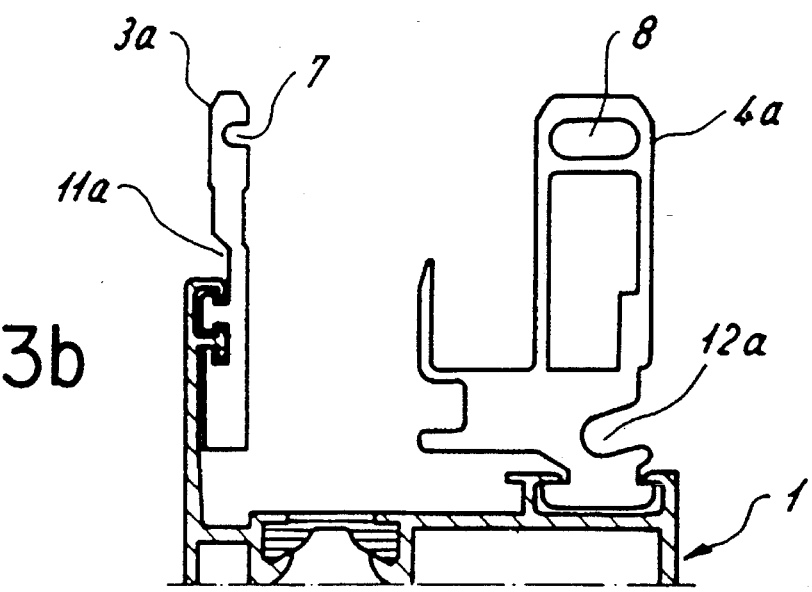
Figure 4:
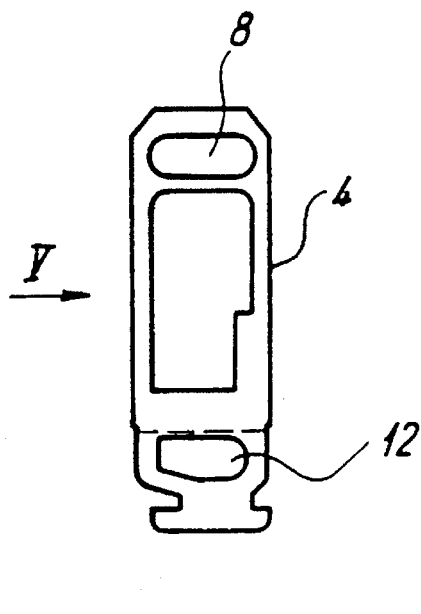
FIG. 4 is a front view of a T-joint part according to the embodiment of FIG. 1.
Figure 5:
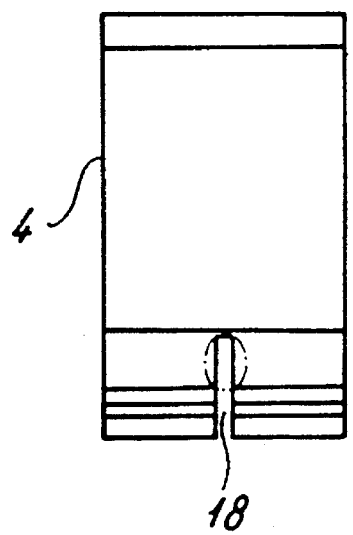
FIG. 5 is a view looking in the direction of arrow V in FIG. 4.
Figure 6:
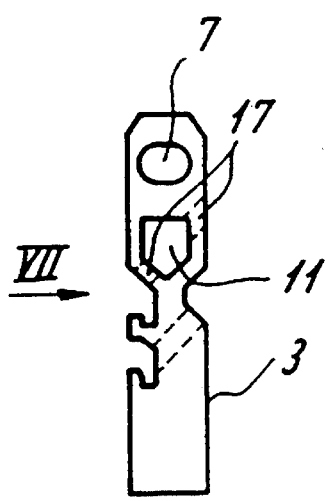
FIG. 6 is a front view of another T-joint part according to the embodiment of FIG. 1.
Figure 7:
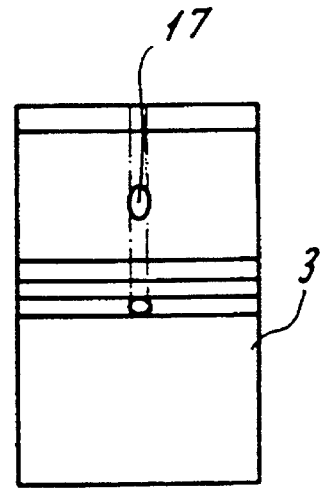
FIG. 7 is a view looking in the direction of arrow VII in FIG. 6.

FIG. 3 shows an alternative embodiment of the present invention where the T-joint parts 3a and 4a have grooves 11a and 12a that are open on one side. After the rung-type section 2 has been pushed on, these grooves 11a and 12a, which are open on one side, are closed to a glue distribution channel by the cavity walls 13 and 16, respectively. In this embodiment too, two openings 19 and 20 are also provided in the rung-type section 2. After assembly, these openings 19, 20 lie flush with the grooves 11a and 12a. In this way, an appropriate glue can again be filled into the lower joint area between the rung-type section 2 and the T-joint parts 3a and 4a, and a specifically directed, material-saving, and clean glue connection can be established. The T-joint pans 3a and 4a of the embodiment illustrated in FIG. 3, can also be provided with transverse openings, so that the glue can be distributed to both sides of the respective T-joint part 3a or 4a.

FIGS. 4 through 7 again show the T-joint parts 3 and 4 of the embodiment illustrated in FIGS. 1 and 2. As is clear from these figures, the transverse openings 17 or 18 can be designed as slots or as holes. Especially in the case where the openings are holes, the holes can be disposed diagonally relative to the cross section of the T-joint part 3, and also at a different heights from one another, depending on which distribution path is desired for the glue that is being filled into the glue distribution channels 11 and 12.

In every case, the design of the present invention entails the advantage that glue can be introduced into the joint area simply and in a specific, purposeful manner, and that the disadvantages of working with glue under exposed conditions are eliminated.

From the foregoing description, it will be appreciated that the present invention makes available, a compact, cost efficient mechanically connected and glued frame-section and rung section in a T-joint.

Having described the presently preferred exemplary embodiment of a new and improved T-joint in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A T-joint comprising:

a frame extending along a longitudinal axis;

a rung having at least one cavity and at least one cavity wall, said at least one cavity wall being substantially parallel to said longitudinal axis, said rung having at least one fill opening; and at least one T-joint part being fixedly connected to said frame, said at least one T-joint part extending into said at least one cavity, said at least one T-joint part being mechanically connected to said rung and being glued to said rung, said at least one T-joint part having at least one glue distribution channel that is substantially parallel to said longitudinal axis, said at least one T-joint part having at least one transverse opening extending toward said at least one cavity wall such that said at least one fill opening, said at least one glue distribution channel and said at least one transverse opening are in fluid communication.

2. The T-joint of claim 1, wherein said glue distribution channel is open all the way along its length and is bounded exclusively by said corresponding cavity walls.

3. The T-joint of claim 1, wherein said at least one glue distribution channel is an open-face cavity of the T-joint part.

4. The T-joint of claim 1, wherein said glue distribution channel is formed by a groove in said T-joint part, said groove being open on one side and being parallel to said longitudinal axis and said groove being closed to said at least one glue distribution channel by said at least one cavity wall which is disposed opposite to said open groove side.

5. The T-joint of claim 1, wherein said at least one transverse opening is a transverse hole.

6. The T-joint of claim 1, wherein said at least one transverse opening is a transverse slot.

7. The T-joint of claim 5, wherein said transverse hole runs at an angle relative to a longitudinal axis of said rung.

* * * * *